United States Patent [19]
Klisch et al.

[11] 3,979,340
[45] Sept. 7, 1976

[54] OLEFIN SULFONATE DETERGENT COMPOSITIONS

[75] Inventors: Stephen Cajetan Klisch, Somerset; Charles Andrew Martin, Morris Plains, both of N.J.

[73] Assignee: Colgate-Palmolive Company, New York, N.Y.

[22] Filed: Apr. 9, 1973

[21] Appl. No.: 348,873

[52] U.S. Cl. ................................ 252/548; 252/542; 252/545; 252/547; 252/552; 252/DIG. 14
[51] Int. Cl.$^2$ .......................................... C11D 1/655
[58] Field of Search ............. 252/548, 555, DIG. 14, 252/552

[56] References Cited
UNITED STATES PATENTS

| | | | |
|---|---|---|---|
| 3,428,654 | 2/1969 | Rubinfeld et al. | 252/555 X |
| 3,506,580 | 4/1970 | Rubinfeld et al. | 252/555 X |
| 3,548,056 | 12/1970 | Eigen | 252/118 X |
| 3,640,880 | 2/1972 | Martin | 252/555 |
| 3,658,985 | 4/1972 | Olson et al. | 252/111 X |
| 3,676,374 | 7/1972 | Zaki et al. | 252/555 X |
| 3,708,437 | 1/1973 | Sweeney | 252/555 |
| 3,755,203 | 8/1973 | Bentley et al. | 252/555 X |
| 3,755,206 | 8/1973 | Verdier | 252/548 X |
| 3,755,429 | 8/1973 | Smitherman | 252/555 X |
| 3,775,349 | 11/1973 | Tuvell et al. | 252/548 X |
| 3,779,933 | 12/1973 | Eisen | 252/118 |
| 3,808,156 | 4/1974 | Gorsich et al. | 252/548 X |
| 3,808,157 | 4/1974 | Dewitt et al. | 252/555 |
| 3,852,221 | 12/1974 | Bentley | 252/555 X |

OTHER PUBLICATIONS

Riso, Protein Derived Detergents, Article in Soap and Chemical Specialties, May 1963, pp. 82–84, 151, 153, 155, 157 and 158.

*Primary Examiner*—Herbert B. Guynn
*Attorney, Agent, or Firm*—Richard N. Miller; Murray M. Grill; Herbert S. Sylvester

[57] ABSTRACT

Liquid detergent compositions are produced containing essentially a mixture of an olefin sulfonate, an alkyl ethoxamer sulfate salt and an alkanolamide foam booster.

4 Claims, No Drawings

OLEFIN SULFONATE DETERGENT COMPOSITIONS

This invention relates to liquid detergent compositions which include an active ingredient mixture of olefin sulfonate and ethoxylated alcohol sulfate and an alkanoic acid alkanolamide foam booster proportioned in an aqueous medium. These compositions are generally classed as light duty detergents and are particularly suitable for dishwashing and laundering fine fabrics.

According to one aspect of this invention there is provided a liquid detergent composition containing, dispersed in aqueous medium, a ternary mixture of surfactants containing essentially of a mixture of (a) a sodium alpha olefin sulfonate having an average of about 14 to 16 carbon atoms, (b) an ammonium salt of an alkyl ethoxamer sulfate which is the monosulfate of an ethoxylation product of an alkanol, said alkanol having an average of about 12 to 15 carbon atoms and said ethoxylation product having about 3 ethenoxy groups per alkanol moiety and (c) an alkanolamide of about 12 to 14 carbon atoms, said alkanolamide being a diethanolamide, an ethoxylated monoethanolamide or mixture of diethanolamide and monoethanolamide the weight ratio of (a) to (b) being about 1.4:1 to 0.9:1, preferably 1.3:1 to 1.1:1; the weight ratios of (a) to (c) being about 30:1 to 2:1, preferably about 10:1 to about 3:1 and the weight ratios of (a) and (b) to (c) being about 40:1 to 4:1, preferably about 30:1 to 5:1.

The detergent compositions of this invention have very good performance, such as evidenced, for instance by foaming power, foam characteristics, detergency, biodegradability, storability, low toxicity, desirable viscosity, resistance to gel formation and ready redissolution of any gel formed.

A particularly suitable olefin sulfonate for use in the compositions is the sulfonation product of an olefin mixture containing about 75–85% straight chain alpha olefin (e.g. olefin of the formula $R-CH=CH_2$ where R is aliphatic hydrocarbon) about 8 or 10 to 20% olefin in which the unsaturation is in a vinylidene group (e.g. olefin of the formula

where R and R' are aliphatic hydrocarbon groups preferably each having at least four carbon atoms), and about 5 to 12% internal olefin (e.g. olefin of the formula $R-CH=CH-R'$ where R and R' are aliphatic hydrocarbon). One preferred method of preparing such an olefin mixture is by polymerization of ethylene with a Ziegler type catalyst to produce a mixture of alpha olefins of various chain lengths, separating therefrom a fraction containing principally $C_{14}$ and $C_{16}$ alpha olefins and a fraction containing lower molecular weight alpha olefins (e.g. of 6 and 8 carbon atoms) and dimerizing the latter fraction and combining the first mentioned fraction with said dimerized fraction.

One particularly suitable olefin mixture has an average of about 14 to 15 (e.g. 14.2 to 14.7) carbon atoms. In a most preferred form the olefin mixture has less than 10% (e.g. below 5%, such as 2%) olefins of less than 14 carbon atoms and less than 10% (e.g. below 5%, such as 2%) olefins of more than 16 carbon atoms.

The sulfonation of the olefin may be effected with sulfur trioxide at low partial pressure thereof (e.g. a partial pressure below about 100 mm of mercury, preferably below about 25 mm of mercury). The $SO_3$ may be in gaseous form diluted with an inert diluent (e.g. air) or undiluted (in vacuum), it may also be in liquid form (e.g. in solution in $SO_2$ at low temperature, such as 0°C). The $SO_3$; olefin mol ratio is usually about 1:1 to 1.2:1, preferably less than about 1.12:1, such as about 1.05–1.1:1. The reaction product from the sulfonation may be then mixed with a 10–15% molar excess of aqueous caustic to effect neutralization of the sulfonic acids and heated to effect hydrolysis by ring opening of the sultones present as a major proportion of the reaction product. The resulting product typically contains by weight an amount of alkenyl sulfonate which is within the range of about 40 to 80% (preferably about 50 to 70%), an amount of hydroxyalkane sulfonate, which is within the range of about 15 to 70% (preferably 20 to 40%) about 5 to 12% by weight of hydroxy alkane disulfonate, and alkene disulfonate and up to about 7% to about 15%, as impurities designated as sodium sulfate, free oil and sodium chloride. Sulfonation processes are described, for instance, in U.S. Pat. No. 3,462,525 issued Aug. 19, 1969, to Levinsky et. al., U.S. Pat. No. 3,428,654 issued Feb. 18, 1969 to Rubinfeld et. al., U.S. Pat. No. 3,420,875 issued Jan. 7, 1969 to Disalvo et. al., U.S. Pat. No. 3,506,580 issued Apr. 14, 1970 to Rubinfeld et. al., U.S. Pat. No. 3,579,537 issued May 18, 1971 to Rubinfeld et. al., and U.S. Pat. No. 3,524,864 issued Aug. 18, 1970 to Rubinfeld et. al.

It is also within the broader scope of the invention to use other olefins as the raw material, e.g., olefins made by cracking petroleum wax, substantially pure α-olefins made by polymerization of ethylene, and olefins made by dehydration of higher alcohols having the average chain lengths and distributions of molecular weights described above. Also, the average carbon content may be, less preferably, outside the range of about 14–16 carbon atoms, e.g. 12, 13, 17 or 18 carbon atoms. The olefin sulfonate may also be wholly or partially in the form of a water soluble salt other than the sodium salt, such as potassium, ammonium, mono- di- or triethanolammonium salt or mixtures thereof.

The ethoxylated alcohol sulfate may be produced by ethoxylating with ethylene oxide a natural alcohol or a synthetic alcohol produced by Zeigler or Oxo process having from about 12 to 15 carbon atoms, preferably a primary alkanol, and thereafter sulfating this reaction product to form the monosulfuric acid and then neutralizing to form the ammonium monosulfate salt. It is also within the broader scope of the invention to use other salts, e.g. sodium or triethanolammonium salts and ethoxylation products having other degrees of ethoxylation (such as about 1 to 5 mols of ethylene oxide per mol of alkanol).

Typical suitable alkanols have the following distributions of carbon chains: 0.5% $C_{10}$, 33.6% $C_{12}$, 0.6% $C_{13}$ 61.1% $C_{14}$, 0.1% $C_{15}$, 3.6% $C_{16}$ and 0.4% post $C_{16}$; 0.7% $C_{10}$, 39.9% $C_{12}$, 2.5% $C_{13}$, 51.9% $C_{14}$, 1.4% $C_{15}$, 3.4% $C_{16}$ and 0.1% post $C_{16}$; 31.2% $C_{12}$, 1.8% $C_{13}$, 61.2% $C_{14}$, 1.6% $C_{15}$ and 3.6% $C_{16}$; 0.8% $C_{11}$, 18.7% $C_{12}$, 24.2% $C_{13}$, 32.3% $C_{14}$, 20.0% $C_{15}$ and 0.3% $C_{16}$. Such alcohol sulfates have a molecular weight of from 420 to 460, preferably from 4$_{J}$0 to 440, e.g. about 435.

It is within the broader scope of the invention to use ethoxylated alcohol sulfates having an average of about 10 to 18 carbon atoms.

The third essential ingredient in the liquid detergent compositions consists of the diethanolamide, ethoxylated monoethanolamide and a mixture of mono- and di- ethanolamide.

A preferred alkanoic acid diethanolamide may be produced by reacting one mole of the alkanoic acid methyl ester with slightly more than one mole (e.g. an excess of 5–10%) of diethanolamine in the presence of heat and basic catalyst such as sodium methylate.

The ethoxylated monoethanolamide may be prepared by reacting one mole of the corresponding alkanoic acid monoethanolamide with about 1 to 4, preferably one mole of ethylene oxide, in the presence of a basic catalyst such as sodium hydroxide.

Typical suitable alkanoic acids have the following distribution of carbon chains: 1% max. $C_{8-10}$, 71.2±2% $C_{12}$ 27.8±2% $C_{14}$ and 1% max. $C_{16}$.

Within the broader scope of the invention alkanoic acids having an average of about 8 to 18 carbon atoms may be employed.

The mixture of water-soluble olefin sulfonate and water-soluble ethoxylated alcohol sulfate salts generally will be about 10% to 40% by weight of the liquid detergent composition and preferably about 25% to 35% by weight.

The proportion of alkanoic acid alkanolamide or alkanolamide mixtures in the detergent compositions generally will be an amount selected from the range of 1.0 to 10%, preferably 2% to 6% by weight which is sufficient to provide improved foam stability or improved foam volume.

The following examples serve to illustrate the inventive detergent compositions. All concentrations in the examples are expressed in percent by weight unless otherwise indicated.

EXAMPLES 1–3

The following liquid detergent compositions are prepared.

The olefin sulfonate, water and alcohol are combined and mixed with low speed agitation at room temperature. To this mixture are added the formula amounts of lauric-myristic diethanolamide and ethoxylated $C_{12-15}$ alcohol ammonium sulfate. The ingredients are mixed for about 5 minutes or until the mixture is uniform. The pH of the mixture is adjusted to 7.3±0.3 by the addition of caustic or acid as necessary. If necessary, the mixture may then be filtered to produce a clear product which may be placed in storage for future use.

The formulations of Examples 1–3 are tested for amount of gel formation and ability to redissolve gel formed as follows:

About 100 ml of each liquid detergent (Examples 1–3) is poured into bottle which is thereafter sealed and placed into a 25°F constant temperature bath. After three days the bottles are removed and visual observations are taken and recorded of the quantity of gel formation. Thereafter the bottles are allowed to stand at room temperature and the amount of time required for the gel to redissolve recorded.

The presence of a gel formation leads to the plugging of outlets or nozzles of certain dispensers in which a liquid detergent is packaged.

The number of plates washed by the formulations are also tested using "The Miniature Dishwashing Evaluation Method" (Journal of the American Oil Chemists Society Vol. 43, No. 10 pp 576–580). In this method (mini-plates) two different sizes of watch glasses soiled with a weighed amount of fatty soil are washed in a solution of the detergent being tested and the foaming power of the solution is measured in terms of mini-plates washed prior to exhaustion of foam.

The results obtained for Examples 1–3 are set forth in Table A.

Table A

| | Ratio of Olefin Sulfonate to Ethoxylated Sulfate | %-Gel Formation | Gel Redissolution time | Plates Washed at 50 ppm |
| --- | --- | --- | --- | --- |
| Example 1 | 1.6:1 | 6.0% | 18 hours | 36 |
| Example 2 | 1.1:1 | 0.5% | 18 hours | 39 |
| Example 3 | 0.7:1 | 9.5% | 6 days | 37 |

It will be seen that for the compositions of this invention the tendency to form a undesirable gel like skin is unexpectedly less and the number of plates washed is greater.

The following examples illustrate compositions which employ the advantages of the subject invention, producing excellent detergent compositions.

| Ingredient | | | |
| --- | --- | --- | --- |
| *Sodium alpha olefin ($C_{14-16}$) sulfonate | 19.0 | 16.0 | 13.0 |
| **Ethoxylated ($C_{12-15}$) alcohol ammonium sulfate | 12.0 | 15.0 | 18.0 |
| ***Lauric-myristic diethanolamide | 5.0 | 5.0 | 5.0 |
| Ethanol | 8.0 | 8.0 | 8.0 |
| Water | Bal. | Bal. | Bal. |
| | 100.0 | 100.0 | 100.0 |

*A mixture of from 50% to 75% alkenyl sulfonate, 20% to 40% hydroxyalkane sulfonate and 5% to 12% of alkene disulfonate and hydroxy alkane disulfonate produced by sulfonating a $C_{14-18}$ olefin blend having a carbon distribution of 2.0% max. $C_{12}$, 66.2±2.0% $C_{14}$, 33.4±2.0% $C_{16}$, an average carbon chain length of 14.6, an average molecular weight of 205, a ratio of alpha olefin to vinylidene olefin of 6.4:1 and a ratio of alpha olefin to internal olefins of 9.6:1.

**An ethoxylated $C_{12-15}$ alcohol triethoxamer ammonium sulfate having a chain distribution of 0.8% $C_{11}$, 18.7% $C_{12}$, 24.2% $C_{13}$, 32.3% $C_{14}$, 20.0% $C_{15}$ and 0.3% $C_{16}$ and an average molecular weight of 436.

***Produced by reacting one mole of lauric-myristic methyl ester with 1.2 moles of diethanolamine in the presence of sodium methylate. The acyl-radical has a carbon chain distribution of 1% max. $C_{8-10}$, 71.2±2.0% $C_{12}$, 27.8±2.0% $C_{14}$ and 1% max. $C_{16}$.

EXAMPLE 4

A liquid detergent having the following composition is prepared.

| Ingredient | % |
| --- | --- |
| *Sodium alpha olefin (C$_{14-16}$) sulfonate | 16.1 |
| **Ethoxylated (C$_{12-15}$) alcohol ammonium sulfate | 13.8 |
| ***Lauric-myristic diethanolamide | 3.0 |
| ****Lauric-myristic monoethanolamide | 1.5 |
| Sodium xylene sulfonate | 1.2 |
| Sodium isethionate | 4.0 |
| Hydroxyethyl ethylenediaminetriacetic acid trisodium salt ("hydroxy EDTA") | 0.08 |
| Magnesium sulfate heptahydrate | 1.0 |
| *****Water-soluble protein | 1.0 |
| Ethanol | 6.0 |
| Water | Bal. |
| | 100.0 |

*As in Examples 1-3
**As in Examples 1-3
***As in Examples 1-3
****Produced by reacting one mole of lauric-myristic fatty acid with one mole of monoethanolamine. The acyl radical has a carbon chain distribution of 1% max. C$_n$-C$_{10}$, 71.2±2.0% C$_{12}$, 27.8±2.0% C$_{14}$ and 1% max. C$_{16}$.
*****A partially hydrolyzed collagen protein having an average molecular weight of 1,000.

EXAMPLE 5

A liquid detergent having the following composition is prepared.

| Ingredient | % |
| --- | --- |
| *Sodium alpha olefin (C$_{14-16}$) sulfonate | 16.1 |
| **Ethoxylated (C$_{12-15}$) alcohol ammonium sulfate | 13.8 |
| ***Lauric-myristic diethanolamide | 3.0 |
| ****Lauric-myristic monoethanolamide | 2.0 |
| Sodium xylene sulfonate | 1.6 |
| Sodium isethionate | 4.0 |
| Hydroxy EDTA | 0.08 |
| Magnesium sulfate heptahydrate | 1.0 |
| *****Water-soluble protein | 1.0 |
| Ethanol | 6.0 |
| Water | Bal. |
| | 100.0 |

*,,*As in Examples 1-3
** and ***As in Examples 4

The olefin sulfonate, water and alcohol are combined and mixed with low speed agitation at room temperature. To this mixture are added in order the formula amounts of lauric-myristic diethanolamide, lauric-myristic monoethanolamide, sodium xylene sulfonate, sodium isethionate, magnesium sulfate, hydroxy EDTA and ethoxylated alcohol (C$_{12-15}$) ammonium sulfate. The ingredients are mixed for about 5 minutes or until the mixture is uniform. The pH of the mixture is adjusted to 7.3±0.3 by the addition of acid or caustic as necessary and then the formula amount of hand care agent is added. Thereafter, color and perfume may also be added if desired. If necessary, the mixture may then be filtered to produce a clear product which may be placed in storage for future use.

As indicated in Examples 4 and 5, selected amounts of monoethanolamide may be added to the detergent composition in place of the diethanolamide provided that the monoethanolamide does not exceed about 55% more preferably about 50% by weight of the total alkanolamide foam booster.

The following liquid detergent compositions are prepared as in Examples 4 and 5.

| | 6 | 7 | 8 | 9 |
| --- | --- | --- | --- | --- |
| *Sodium alpha olefin (C$_{14-16}$) sulfonate | 16.1 | 16.1 | 16.1 | 16.1 |
| **Ethoxylated (C$_{12-15}$) alcohol ammonium sulfate | 13.8 | 13.8 | 13.8 | 13.8 |
| ***Lauric-myristic diethanolamide | 1.0 | 3.0 | 4.0 | 6.0 |
| Hydroxy EDTA | 0.2 | 0.2 | 0.2 | 0.2 |
| Magnesium sulfate heptahydrate | 1.0 | 1.0 | 1.0 | 1.0 |
| Sodium isethionate | 5.0 | 5.0 | 5.0 | 5.0 |
| ****Water-soluble protein | 1.0 | 1.0 | 1.0 | 1.0 |
| Ethanol | 3.0 | 3.0 | 3.0 | 3.0 |
| Water | Bal. | Bal. | Bal. | Bal. |
| | 100.0 | 100.0 | 100.0 | 100.0 |

*, and *As in Examples 1-3
****As in Example 4

EXAMPLES 10–17

The following liquid detergent compositions are prepared as in Examples 4 and 5.

| | 10 | 11 | 12 | 13 | 14 | 15 | 16 | 17 |
| --- | --- | --- | --- | --- | --- | --- | --- | --- |
| *Sodium alpha olefin (C$_{14-16}$) sulfonate | 16.1 | 16.1 | 16.1 | 16.1 | 16.1 | 16.1 | 16.1 | 16.1 |
| **Ethoxylated (C$_{12-15}$) alcohol ammonium sulfate | 13.8 | 13.8 | 13.8 | 13.8 | 13.8 | 13.8 | 13.8 | 13.8 |
| Ethoxylated cocomonoethanolamide | 1.0 | 2.0 | 3.0 | 4.0 | | | | |
| Ethoxylated lauric monoethanolamide | | | | | 1.0 | 2.0 | 3.0 | 4.0 |
| Hydroxy EDTA | 0.2 | 0.2 | 0.2 | 0.2 | 0.2 | 0.2 | 0.2 | 0.2 |
| Magnesium sulfate heptahydrate | 1.0 | 1.0 | 1.0 | 1.0 | 1.0 | 1.0 | 1.0 | 1.0 |
| Sodium isethionate | 5.0 | 5.0 | 5.0 | 5.0 | 5.0 | 5.0 | 5.0 | 5.0 |
| ***Water-soluble protein | 1.0 | 1.0 | 1.0 | 1.0 | 1.0 | 1.0 | 1.0 | 1.0 |
| Ethanol | 4.0 | 4.0 | 4.0 | 4.0 | 4.0 | 4.0 | 4.0 | 4.0 |
| Water | Bal. | Bal. | Bal. | Bal. | Bal. | Bal. | Bal. | Bal. |

| | 10 | 11 | 12 | 13 | 14 | 15 | 16 | 17 |
|---|---|---|---|---|---|---|---|---|
| | 100.0 | 100.0 | 100.0 | 100.0 | 100.0 | 100.0 | 100.0 | 100.0 |

\* and \*\*As in Examples 1–3
\*\*\*As in Example 4

The ethoxylated alcohol sulfates of Examples 1–17 are readily available as commercial products such as ALFONIC 1412-A and NEODOL 25-3A. Commercial alkanoic acid monoethanolamides such as MONAMID LM-MA and EMID No. 6504 grade, commercial alkanoic acid diethanolamides such as TREPOLINE STD and MONAMID 150 LMW-C and commercial ethoxylated alkanoic acid monoethanolamides such as AMIDOX L-1 and AMIDOX C-1 may be used to advantage.

The detergent mixture and alkanoic acid alkanolamide foam booster are generally solubilized in an aqueous medium to form a homogeneous liquid product. This aqueous medium may be water alone where the ingredients are sufficiently soluble or dispersible therein or it may consist of a mixture of water and an assistant solubilizer selected from the group consisting of $C_2$–$C_3$ monohydric alcohols and water-soluble salts of organic sulfonated or sulfated hydrotropes containing an alkyl group having up to six carbon atoms and mixtures thereof. Suitable alcohols include ethanol, propanol and isopropanol with ethanol being preferred. Suitable organic sulfonate hydrotropes include alkyl aryl sulfonates having up to 3 carbon atoms in the alkyl group such as sodium, potassium and ammonium toluene, xylene and cumene sulfonates. Suitable organic sulfate hydrotropes are the $C_5$–$C_6$ alkyl sulfate, sodium, potassium, ammonium or mono-, di- and triethanolammonium salts.

The proportion of the aqueous medium generally will be from about 30% to about 90%, preferably about 40% to 70% by weight of the liquid detergent. When present, the alcoholic solubilizer concentration will be about 1% to 10%, preferably 3% to 7%, by weight and the hydrotrope concentration will vary from about 0.5% to 6%, preferably 1% to 3% by weight, said weights being based upon the weight of the liquid detergent.

In one preferred embodiment, the liquid detergent compositions will include from 0.25% to 3%, preferably 1% to 2%, by weight of a water-soluble substantive protein to reduce irritation of the skin on the fingers and hands of; the user. Chemically, the protein ingredient is a low molecular weight polypeptide obtained by hydrolysis of protein materials such as human and animal hair, horns, hides, hoofs, gelatin, collagen, and the like. During hydrolysis the proteins are gradually broken down into their constituent polypeptides and amino acids by prolonged heating with acids, e.g., sulfuric acid, or alkalais, e.g., sodium hydroxide, or treatment with enzyme, e.g., peptidases. In hydrolysis, high molecular weight polypeptides are formed first and as hydrolysis proceeds these are converted progressively to simpler and simpler polypeptides to tripeptides, dipeptides, and finally to amino acids. It is obvious that the polypeptides derived from proteins are complex mixtures and in practice the average molecular weight of the hydrolysis product will vary from 120 (amino acids) to about 20,000. All satisfactory hydrolyzed polypeptides are characterized by water solubility. In compositions which contain soluble protein it is preferred to use hydrolyzed collagen of such low molecular weight as to be completely soluble in water, non-gelling, and non-denaturing with an average molecular weight below 15,000, preferably in the range of about 500 to 10,000 with optimum results occuring at a molecular weight of about 1,000.

The detergent compositions of the present invention may also include other conventional ingredients generally used in such formulations.

Water hardness salts such as magnesium sulfate and calcium chloride may be employed at concentrations of 0.5% to 4% by weight to enhance foaming in soft water. Sequestrants such as alkali metal citrates, gluconates and aminopolycarboxylates may be present in amounts from 0.1% to 1% by weight to sequester metallic ions such as iron found in wash water. Other adjuvants such as brighteners, colorants, emollients, perfumes, bacteriocides and the like may also be added to the detergent composition in concentrations up to about 2% by weight to improve various properties thereof.

Anti-gelling agents such as the water soluble salts of an organic sulfonic acid having less than 5 carbon atoms, (e.g. sodium, isethionate, trisodium sulfosuccinate and sodium allyl sulfonate) may be employed at concentrations of about 1% to 8% by weight to further enhance the anti-gelling and gel dissolution characteristics of the detergent compositions.

Preferred compositions of the present composition, however, are substantially free of builder salts.

In particularly suitable compositions according to this invention, which have good detergency, gel resistance, low toxicity and good storability, the mol percent of ammonium cations is at least about 15 mol percent (e.g. 20%, 25%, 30% or more, such as 90 or 100%).

That is, the ammonium cations constitute at least 15 mol percent of all the cations in the composition. This percentage can be easily calculated; thus, simple calculation, based solely on the proportions and molecular weights of the different salts present in the composition (e.g. sodium olefin sulfonate, ammonium alkyl ether sulfate, etc.) indicates that the mol percent of ammonium cations in Example 4 is about 20%.

In addition to the foregoing ingredients, the liquid detergent compositions may, less preferably, include minor proportions of other surfactants which do not adversely affect the composition's excellent characteristics. Such detergents generally will be present in amounts well below about 10%, preferably below about 5% of the total detergent content of the composition. Such detergents may be any compatible anionic, nonionic, amphoteric, zwitterionic and polar nonionic detergent which achieves good detergency, wetting or lathering characteristics or other advantageous detergent characteristics.

Suitable anionic detergents include the higher alkyl mononuclear aromatic sulfonates such as the higher alkyl benzene sulfonates containing from 10 to 16 carbon atoms in the higher alkyl group in a straight or branched chain, for example, the sodium, potassium and ammonium salts of higher alkyl benzene sulfonates, higher alkyl toluene sulfonates, higher alkyl phenol sulfonates and higher naphthalene sulfonates; paraffin sulfonates containing about 10 to 20 carbon atoms, for example, the primary paraffin sulfonates are made by reacting long-chain alpha olefins and bisulfites and paraffin sulfonates having the sulfonated group distributed along the paraffin chain as shown in U.S. Pat. Nos. 2,503,280, 2,507,088, 3,260,741, 3,372,188 and German Pat. No. 735,096; sodium and potassium sulfates of higher alcohols containing 8 to 18 carbon atoms such as sodium lauryl sulfate and sodium tallow alcohol sulfate; sodium and potassium salts of $\alpha$-sulfofatty acid esters containing about 10 to 20 carbon atoms in the acyl group, for example, methyl $\alpha$-sulfomyristate and methyl $\alpha$-sulfotallowate, ammonium sulfates of mono- or di-glycerides of higher ($C_{10}$–$C_{18}$) fatty acids, for example, stearic monoglyceride monosulfate; sodium higher alkyl ($C_{10}$–$C_{18}$) glyceryl ether sulfonates; and sodium or potassium alkyl phenol polyethenoxy ether sulfates with about 1 to 6 oxyethylene groups per molecule and in which the alkyl radicals contain about 8 to about 12 carbon atoms.

Other suitable anionic surface active agents include the $C_8$ to $C_{18}$ acyl sarcosinates (for example sodium lauroyl sarcosinate); sodium and potassium salts of the reaction product of higher fatty acids containing 8 to 18 carbon atoms in the molecule esterified with isethionic acid; and sodium and potassium salts of the $C_8$ to $C_{18}$ acyl N-methyl taurides, for example, sodium cocoyl methyl taurate and potassium stearoyl methyl taurate.

Other types of surface active agents useful in the practice of the present invention are the nonionic synthetic organic detergents which are generally the condensation product of an organic aliphatic or alkyl aromatic hydrophobic compound and hydrophilic ethylene oxide groups. Practically any hydrophobic compound having a carboxy, hydroxy, amido, or amino group with a free hydrogen attached to the nitrogen can be condensed with ethylene oxide or with the polyhydratation product thereof, polyethylene glycol, to form a nonionic detergent. Further, the length of the polyethenoxy chain can be adjusted to achieve the desired balance between the hydrophobic and hydrophilic elements.

The nonionic detergents include the polyethylene oxide condensate of one mole of alkyl phenol containing from about 6 to 12 carbon atoms in a straight- or branched-chain configuration with about 5 to 30 moles of ethylene oxide, for example, nonyl phenol condensed with 9 moles of ethylene oxide, dodecyl phenol condensed with 15 moles of ethylene and dinonyl phenol condensed with 15 moles of ethylene oxide. Condensation products of the corresponding alkyl thiophenols with 5 to 30 moles of ethylene oxide are also suitable.

Also included in the nonionic detergent class are the condensation products of a higher alcohol (e.g. an alkanol containing about 8 to 18 carbon atoms in a straight or branched-chain configuration) condensed with about 5 to 30 moles of ethylene oxide, for example, lauryl-myristyl alcohol condensed with about 16 moles of ethylene oxide.

One group of nonionics is marketed under the trade name "Pluronics." The compounds are formed by condensing ethylene oxide with a hydrophobic base formed by the condensation of propylene oxide with propylene glycol. The molecular weight of the hydrophobic portion of the molecule is of the order of 950 to 4,000 and preferably 1,200 to 2,500. The addition of polyoxyethylene radicals to the hydrophobic portion tends to increase the solubility of the molecule as a whole. The molecular weight of the block polymers varies from 1,000 to 15,000, and the polyethylene oxide content may comprise 20% to 80% by weight.

Zwitterionic detergents such as the betaines and sulfobetaines having the following formula are also useful:

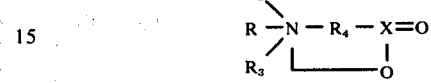

wherein R is an alkyl group containing about 8 to 18 carbon atoms, $R_2$ and $R_3$ are each an alkylene or hydroxyalkylene group containing about 1 to 4 carbon atoms, $R_4$ is an alkylene or hydroxyalkylene group containing 1 to 4 carbon atoms, and X is C or S:O. The alkyl group can contain one or more intermediate linkages such as amido, ether, or polyether linkages or nonfunctional substituents such as hydroxyl or halogen which do not substantially affect the hydrophobic character of the group. When X is C, the detergent is called a betaine; and when X is S:O, the detergent is called a sulfobetaine or sultaine. Preferred betaine and sulfobetaine detergents are 1-(lauryl dimethylammonio) acetate 1-(myristyl dimethylammonio) propane-3-sulfonate, and 1-(myristyldimethylammonio)-2-hydroxypropane-3-sulfonate.

The polar nonionic detergents are those in which the hydrophilic group contains a semi-polar bond directly between two atoms, for example, N → O, As → O, and S → O. There is charge separation between the two directly bonded atoms, but the detergent molecule bears no net charge and does not dissociate into ions.

Among the polar nonionic detergents are open-chain aliphatic amine oxides of the general formula $R_1R_2R_3N \rightarrow O$. For the purpose of this invention $R_1$ is an alkyl, alkenyl, or monohydroxyalkyl radical having about 10 to 16 carbon atoms, $R_2$ and $R_3$ are each selected from the group consisting of methyl, ethyl, propyl, ethanol, and propanol radicals.

Other operable polar nonionic detergents are the open-chain aliphatic phosphine oxides having the general formula $R_1R_2R_3P \rightarrow O$ wherein $R_1$ is an alkyl, alkenyl, or monohydroxyalkyl radical ranging in chain length from 10 to 18 carbon atoms, and $R_2$ and $R_3$ are each alkyl and monohydroxyalkyl radicals containing from 1 to 3 carbon atoms.

Examples of suitable ampholytic detergents include the alkyl beta-aminopropionates, $RN(H)C_2H_4COOM$; the alkyl beta-iminodipropionates, $RN\ C_2H_4SO_3M$; and the long-chain imidazole derivatives having the following formulas:

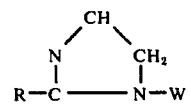

(I)

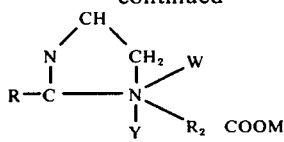

wherein R is an acyclic group of about 7 to 17 carbon atoms, W is selected from the group of $R_2OH$, $R_2COOM$, and $R_2OR_2COOM$, Y is selected from the group consisting of $OH^-$, $R_3OSO_3^-$, $R_2$ is an alkylene or hydroxyalkylene group containing 1 to 4 carbon atoms, $R_3$ is selected from the group consisting of alkyl, alkyl aryl and fatty acyl glyceride groups having 6 to 18 carbon atoms in the alkyl or an acyl group; and M is a water-soluble cation, for example, sodium, potassium, ammonium, for alkylolammonium.

Formula I detergents are disclosed in Volume II of "Surface Active Agents and Detergents" and Formula II detergents are described in U.S. Pat. Nos. 2,773,068; 2,781,354; and 2,781,357. The acyclic groups may be derived from coconut oil fatty acids (a mixture of fatty acids containing 8 to 18 carbon atoms), lauric fatty acid, and oleic fatty acid, and the preferred groups are $C_7$ to $C_{17}$ alkyl groups. Preferred detergents are sodium N-lauryl beta-aminopropionate, disodium N-lauryl iminodipropionate, and the disodium salt of 2-laurylcycloimidium-1-hydroxyl, 1-ethoxyethanoic acid, 1-ethanoic acid.

Although the present invention has been described with reference to particular embodiments and Examples, we wish it to be understood that we do not desire to be limited to the exact detail of such embodiments for obvious modification will occur to a person skilled in the art.

What is claimed is:

1. A liquid detergent composition having reduced gelling tendency which consists essentially of 25 to 35% by weight of a mixture of the sodium salt of a sulfonated alpha olefin containing about 14 to 16 carbon atoms and an ammonium salt of an ethoxylated alcohol sulfate containing an alkyl group having an average of about 12 to 15 carbon atoms and from 1 to 5 ethenoxy groups, the weight ratio of olefin sulfonate to alcohol sulfate being about 1.1:1, and 1% to 10% by weight of a $C_{12}$–$C_{14}$ alkanoic acid diethanolamide in 30% to 90% by weight of an aqueous medium containing from 1% to 10% by weight of ethanol, said composition containing at least 15 mole per cent of ammonium cations.

2. A liquid detergent composition in accordance with claim 1 wherein a $C_{12}$–$C_{14}$ alkanoic acid monoethanolamide is substituted for up to 55% by weight of said diethanolamide.

3. The liquid detergent composition of claim 1 which further includes from about 0.25% to about 3% by weight of a water soluble protein hydrolysate having a molecular weight of from about 120 to about 20,000.

4. The liquid detergent composition of claim 3 wherein said protein hydrolysate is derived from collagen and has a molecular of from 500 to 10,000 and is present in the amount of from about 1% to 2% by weight of the detergent composition.

* * * * *